UNITED STATES PATENT OFFICE.

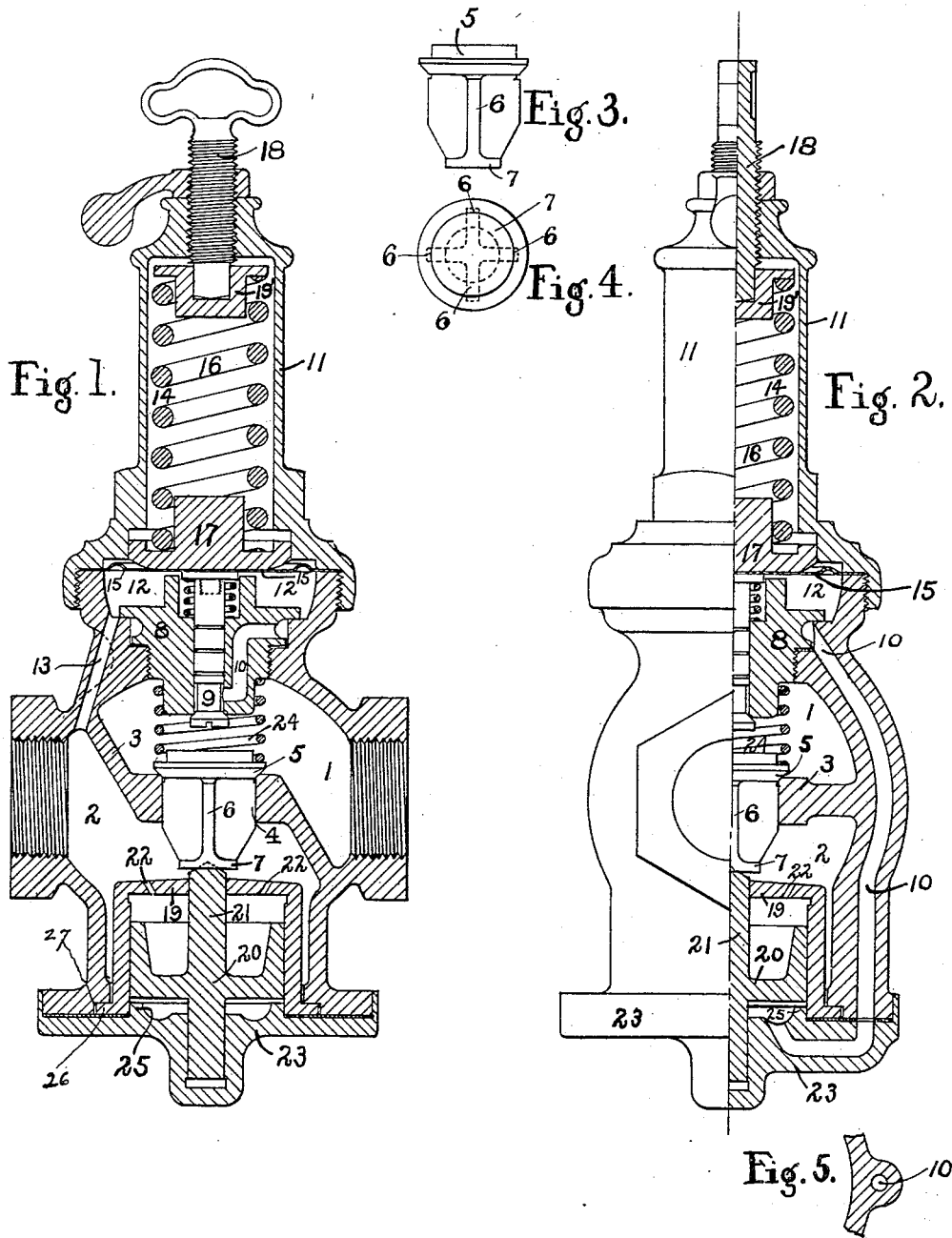

FREDERICK H. SAUER, OF NEW YORK, N. Y.

PRESSURE-REGULATOR.

SPECIFICATION forming part of Letters Patent No. 625,520, dated May 23, 1899.

Application filed November 1, 1898. Serial No. 695,203. (No model.)

*To all whom it may concern:*

Be it known that I, FREDERICK H. SAUER, a citizen of the United States, residing at New York, in the county of New York and State of New York, have invented certain new and useful Improvements in Pressure-Regulators, of which the following is a full, clear, and exact specification.

My invention relates to pressure-regulators or reducing-valves, and particularly to that class of regulators employing a main valve and means for opening and closing the latter to allow the passage of a proper amount of fluid to keep the pressure in the outlet constant at a predetermined value.

The object of the present invention is to construct a regulator of few and simple parts, all of which shall be easily accessible and which shall operate accurately under all conditions in a smooth and noiseless manner.

The invention possesses various features of advantage which will more clearly appear hereinafter.

In the accompanying drawings, Figure 1 is a sectional view of a regulator embodying my invention. Fig. 2 is an elevation of the construction shown in Fig. 1. Figs. 3 and 4 are respectively detail side and end views of the main valve, and Fig. 5 is a detail plan view showing the outside passage to the piston-casing.

Referring more particularly to the drawings, 1 and 2 respectively represent the inlet and outlet openings, and 3 the usual wall separating the same, the wall 3 having the opening 4, in which is seated the main valve 5. Valve 5 should ordinarily be seated in the direction of the inlet-opening, as shown in the drawings, in order that the pressure therein will always tend to close the valve. Although any suitable form of valve may be used, I prefer the form shown in the drawings, having the guide-wings 6 6 and the projection 7 thereon, the guide-wings being adapted to steady the valve in its seat and the projection 7 presenting a surface against which fluid passing through the valve from high to low pressure chamber at a velocity strikes and assists in quickly and firmly closing the main valve without the assistance of a heavy spring, such as has heretofore been generally used to accomplish a satisfactory closing. A plug 8, containing the usual secondary valve 9, which controls the opening from the inlet-opening 1 to passage 10, preferably cast on the outside of the shell, which communicates with the piston to be hereinafter described, is screwed into or otherwise fixed to the shell of the regulator, and a casing 11 is also attached to the shell in suitable manner, whereby there will be formed a chamber 12, communicating with the outlet-opening by a port 13. Within the casing 11 is the usual chamber 14, formed by a flexible diaphragm 15 between the casing and the plug, the chamber 14 containing a spring 16 and a head 17, adapted to exert a constant pressure against the diaphragm in opposite direction to the outlet-pressure of the fluid in chamber 12. The strength of the spring is such as to exert a pressure against the diaphragm sufficient to move it to open the secondary valve against the pressure of the inlet when the pressure in the outlet-opening falls below the normal. Other means may be employed in lieu of the spring and diaphragm here shown.

18 is a thumb-screw impinging against the head 19' on spring 16, wherewith the strength of the spring may be varied at will.

A casing 19, containing a piston 20, having a stem 21, preferably cast on the piston, adapted to impinge against the main valve 5, is provided within the outlet-opening and exposed on all sides to the fluid in the outlet-opening. Preferably this casing will comprise an independent cylinder of less diameter than the diameter of the outlet-opening, loosely mounted in the valve-shell, as shown, to leave an open space surrounding the casing between the latter and the shell and supported against a supporting-hub 25, formed on the cap 23 and closely fitting the interior of the casing. The casing is also provided with an annular flange 26, which rests in an annular groove 27 in the shell and prevents the casing from being driven inward. With this construction the casing forms a portion of the wall of the outlet-chamber and is surrounded on all sides by the liquid in the outlet-opening and is free to expand laterally under the influence of heat, and such expansion will not interfere with the accurate operation of the piston or cause the casing to become loose in the regulator. The casing is open to the outlet-opening by one or more ports 22 on one side of the piston and on the other side is open to passage 10. The area of the piston is customarily larger than that of the main valve in order that when high-pressure fluid is allowed in passage 10 by the opening of the valve 9 the pressure upon piston 20 will be sufficient to open the valve 5 against the high pressure upon the latter. The casing 19 is preferably held in place by the cap 23, which may also serve to close the regulator-shell.

In the operation of the regulator above described as long as the pressure in the outlet-opening remains the same as the constant pressure against the diaphragm the secondary valve will be held closed by the high pressure in the inlet-opening; but as soon as the outlet-pressure falls below the constant pressure the latter will force the diaphragm 15 against the secondary valve 9 and open the valve, allowing the high-pressure fluid to pass through the valve and passage 10 into the casing 19, where it will move the piston 20 to open the main valve. When the main valve is opened, the fluid rushes into the low-pressure side with considerable velocity and in so doing strikes the projection 7 upon the valve and assists to close it firmly and quickly, thus obviating the necessity of using the spring 24. When the proper pressure is reached in the outlet-opening, the constant pressure of the spring 16 will be overcome and the valve 9 allowed to close, thus cutting off the high pressure against the piston 20, which holds the main valve open.

The casing 19 being independent of the regulator-shell and being exposed to an even temperature throughout and not exposed to the outside atmosphere renders the expansion of the metal of the casing more even and avoids the sticking or binding of the piston in the casing and consequent uneven and uncertain operation of the regulator common in regulators where a part of the casing is exposed to the atmosphere.

It will be observed that in the construction shown in the drawings all the parts are independent and easily accessible and can be replaced or overhauled without disconnecting the regulator from the pipe with which it is connected.

Having thus described my invention, I declare that what I claim as new, and desire to secure by Letters Patent, is—

1. In a pressure-regulator, the combination with the inlet and outlet openings separated from each other, of a main valve seated independently and controlling the passage of fluid from the inlet to the outlet opening and adapted to be closed by pressure direct from the inlet-opening only, means for opening said valve when the pressure of the fluid in the outlet-opening falls below the predetermined value, and a projection on said valve adapted to receive pressure from the inlet side when the valve is opened and to assist in closing the valve by said inlet-pressure only, substantially as described.

2. In a pressure-regulator, the combination with the inlet and outlet openings separated from each other, of a main valve seated independently and controlling the passage of fluid from the inlet to the outlet opening and adapted to be closed by pressure direct from said inlet-opening only, means for automatically opening said valve when the pressure of the fluid in the outlet-opening falls below a predetermined value, and a projection on said valve adapted to receive pressure from the inlet side when the valve is opened and to assist in closing the valve by said inlet-pressure only, substantially as described.

3. In a pressure-regulator, the combination of a regulator-shell having an inlet-chamber and an outlet-chamber separated from each other, a portion of the wall of the outlet-chamber being cut away, an independent casing, loosely mounted in said shell, said casing being adapted to form the wall of the shell in said cut-away portion and to be surrounded on all its sides by the fluid in the outlet-opening, a main valve controlling the passage of fluid from the inlet to the outlet opening, and a piston in said casing adapted to operate against said main valve to open the same, substantially as described.

In testimony whereof I affix my signature in presence of two witnesses.

FREDERICK H. SAUER.

Witnesses:
C. V. EDWARDS,
GEO. W. HESS.